Sept 10, 1957 R. F. STERLING 2,806,109
ARC RESISTANT MOLDED MEMBERS AND ELECTRICAL
APPARATUS EMBODYING THEM
Filed March 19, 1954
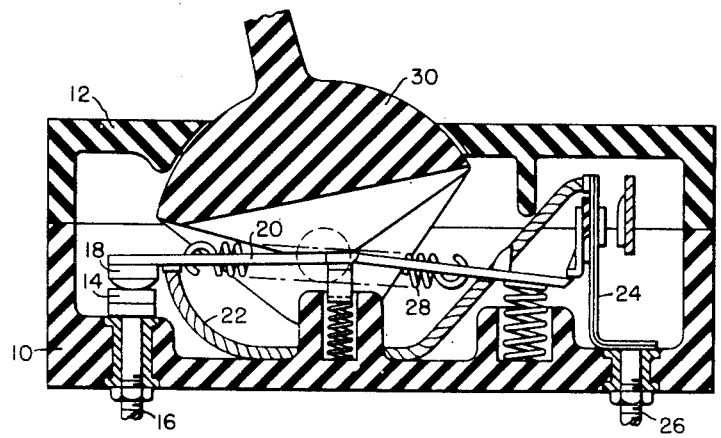
WITNESSES
Robert C. Baird
INVENTOR
Robert F. Sterling.
BY
Frederick Shapoe
ATTORNEY United States Patent Office 2,806,109
Patented Sept. 10, 1957

2,806,109

ARC RESISTANT MOLDED MEMBERS AND ELECTRICAL APPARATUS EMBODYING THEM

Robert F. Sterling, Pittsburgh, Pa., assignor to Westinghouse Electric Corporation, East Pittsburgh, Pa., a corporation of Pennsylvania Application March 19, 1954, Serial No. 417,504

7 Claims. (Cl. 200—144)

This invention relates to molded thermoset resinous members particularly adapted for use as electrical insulation in close proximity to electrical arcs, and electrical equipment embodying such molded members.

Molded resinous electrical insulation employed in members subjected to electrical arcs as, for example, switchgear, is subject to a form of failure known as "tracking." When the molded resinous insulation is disposed in close proximity to an electrical arc, the resins on the surface of the member will decompose and produce a carbonaceous path extending between points subjected to elevated temperatures and voltage stress. With phenolic resins in particular a permanently conducting or low resistance path is formed within the molded surface, and in many instances, the electrical device will no longer maintain full voltage. Tests have been devised and are presently employed for determining the resistance of any particular resinous composition to this type of failure. The resistance to this type of failure, often called "arc resistance" or "tracking resistance," is defined in terms of the number of seconds required to produce a conducting track when subjected to an electrical arc under certain standard conditions, as set forth, for example, in ASTM Standard D495-48T.

While the test values for arc resistance are not readily precisely duplicated, an average of from 5 to 12 tests gives an average or median value which may be duplicated with reasonable closeness providing no substantial changes in the test apparatus or conditions are made. As an example of accepted values, the literature reports that the arc resistance of molded melamine-formaldehyde resins is approximately 180 seconds. This indicates that molded melamine-formaldehyde members may be subjected to an electrical arc under standard test conditions for 180 seconds before a low resistance or conducting track is produced on the surface thereof. Similarly, the literature reports that urea formaldehyde resins have an arc resistance of from 100 to 150 seconds, depending on the fillers and their proportions blended with the urea formaldehyde resins. Phenolic resins, on the other hand, have very poor arc resistance values, ordinarily varying from 5 seconds when embodying organic fillers and up to about 16 seconds when carrying mineral fillers. A recent authority makes the blanket assertion that "the phenolics are rated as poor regardless of filler," with respect to their arc resistance. This statement is accepted by the electrical industry as being true for molded phenolic resin members.

The term "phenolic resin," as employed herein, covers the thermoset phenol-aldehyde reaction products. These include the reaction products of phenol, cresol, xylenols and higher phenols, and mixtures of any of these. The aldehydes are formaldehyde, paraformaldehyde, and other polymers of formaldehyde, furfuraldehyde, acetaldehyde, and the like. Inasmuch as the phenolic resins are widely manufactured and have a combination of excellent physical properties in combination with a low cost, it would be desirable to be able to employ phenolic resins in electrical apparatus under conditions where they may be subjected to arcing, but up to the present time their poor arc resistance has prevented their use in such applications.

The object of the present invention is to provide for phenolic resin compositions embodying selected non-conducting solid inorganic fillers of predetermined particle size and in certain proportions whereby members molded therefrom have a high arc resistance.

Another object of the present invention is to provide in an electrical member which develops an arc during operation of the device a molded phenolic resinous member having a high arc resistance, thereby enabling satisfactory operation of the device during and after arcing.

Other objects of the invention will, in part, be obvious and will, in part, appear hereinafter.

The single figure is a vertical section through a molded switch.

I have discovered that the arc resistance of phenolic compositions may be greatly improved to the extent that members from such phenolic compositions may be employed in electrical apparatus subjected to arcing with as satisfactory results as are obtainable with the best available resinous materials. In particular, I have discovered that the addition of from 3% to 30%, and even more, of the weight of a phenolic composition, of finely divided, non-conducting, inorganic refractory of an average particle size of not in excess of 5 microns will provide greatly increased arc resistance to members molded from such compositions.

More specifically, I have discovered that a progressive improvement is obtained if the finely divided inorganic refractory is employed in increasing amounts going from 3% to 10% by weight of the composition, while the increase in improvement with quantities greater than 10% is less pronounced. Also, particularly significant improvement is obtained with the use of finely divided, non-conducting, inorganic refractory in particle sizes of less than 2 microns. Outstanding results are obtained when the average particle size is not in excess of 0.5 micron.

Examples of suitable non-conducting inorganic refractory materials for the practice of this invention are silica, inorganic silicates, including zirconium silicate, calcium silicate, and aluminum silicate, zirconium oxide, aluminum oxide, calcium carbonate, and boron nitride.

The phenolic molding compositions will ordinarily comprise from 90% to 30% by weight of one or more phenolic resins, including the formaldehyde required to convert them to thermosetting resin. The compositions will ordinarily include a lubricant, dyes, and various strengthening fillers such, for example, as asbestos fibers, wood flour and other conventional additives in molding compositions. However, satisfactory moldings may be prepared from 97% to 70% by weight of thermoset phenolic resin and the balance, from 3% to 30% by weight, of the finely divided inorganic refractory. The addition of other fillers in an amount of up to 120% of the weight of the phenolic resin may be had to secure higher strength and impact values.

In preparing compositions to be molded into thermoset resinous members, a phenol-aldehyde resin, reacted in porportions and under conditions to produce what is commonly called a novolak, is initially prepared. As a rule, the amount of aldehyde is so proportioned that there is less than about 0.86 mol of aldehyde per mol of the phenol, and usually the aldehyde is 0.8 mol and less per mol of the phenol. In many instances, an acid catalyst is employed in preparing the novolak resin. The resins are usually available in the form of powders. These novolak phenolic resins are thermoplastic and require the addition of further amounts of formaldehyde to render them thermosettable. Often, hexamethylene tetramine is incorporated in compositions comprising novolak phenolic resins to supply the required additional formaldehyde to render the composition thermosettable. It will be understood that other sources of formaldehyde, such as paraformaldehyde, may be included in the compositions to this end.

In preparation of molded members, a given amount of phenolic resin in powdered form is admixed with the required amount of hexamethylene tetramine, a lubricant, such as calcium stearate, a dye, and one or more fibrous fillers such as wood flour. To this composition there is added, in accordance with the present invention, at least 3% of the total weight of the composition of the finely divided, inorganic refractory powder of an average particle size of less than 5 microns. The entire mixture is then thoroughly blended, weighed portions are then placed in a hot press and molded to members of desired shape and size at predetermined temperatures and pressures until the phenolic resin reacts and thermosets. Plates, tubes, baffles, and other insulating members are readily produced by such procedures. Meter bases, coil supports, contact supports and other apparatus may be molded from these compositions.

The following phenolic compositions are exemplary of those employed in the industry today:

*Phenolic Molding.—Composition A*

| | Percent |
|---|---|
| Phenol-formaldehyde resin novolak | 19.30 |
| Phenol-furfural novolak | 17.40 |
| Calcium stearate | 0.50 |
| Black nigrosine dye | 1.5 |
| Asbestos fibers (average length ⅛ inch) | 44.63 |
| Wood flour | 14.9 |
| Hexamethylene tetramine | 1.77 |

Median arc-resistance of less than 10 seconds.

*Phenolic molding.—Composition B*

| | Percent |
|---|---|
| Phenol-formaldehyde novolak | 84.8 |
| Hexamethylene tetramine | 10.15 |
| Calcium oxide | 4.2 |
| Calcium stearate | 0.85 |

Fibrous fillers in an amount of up to 120 parts for each 100 parts of this composition B may be added to impart strength to the moldings.

Moldings from 60% of resin B+40% wood flour have a median arc resistance of less than 22 seconds.

*Phenolic molding.—Composition C*

| | Percent |
|---|---|
| Phenol-formaldehyde novolak | 55 |
| Hexamethylene tetramine | 7 |
| Wood flour | 34 |
| Calcium stearate | 2 |
| Dye | 2 |

Median arc resistance of 7 seconds.

A number of members were molded from the phenolic molding composition A with and without finely divided boron nitride of an average particle size of 0.25 micron. The following results were obtained:

TABLE I

| Example | Composition A, percent | Boron Nitride, percent | Arc Resistance Seconds |
|---|---|---|---|
| 1 | 100 | 0 | less than 10. |
| 2 | 80 | 20 | 206, and in excess of 240. |
| 3 | 90 | 10 | 191, 190, 188 and in excess of 240. |
| 4 | 95 | 5 | 179 to 185, a median of 184. |

It will be apparent that the addition of as little as 5% of boron nitride improves the arc resistance of the composition phenomenally, and that increasingly larger amounts of the boron nitride give further improvements in the arc resistance.

The phenolic molding composition B was admixed with various proportions of boron nitride and other fillers with the results indicated in the following table:

TABLE II

| Composition | Arc Resistance Seconds |
|---|---|
| 40% Composition B<br>30% Wood Flour<br>30% Boron Nitride | 186 to in excess of 240, a median of 192. |
| 40% Composition B<br>50% Walnut Shell Flour<br>10% Boron Nitride | 122 to 133, a median of 123. |
| 40% Composition B<br>55% Walnut Shell Flour<br>5% Boron Nitride | 75 to 83, a median of 81. |

The effect of particle size of the refractory powder is illustrated in the following table, wherein phenolic molding composition C was admixed with 10% by weight of finely divided silica of the indicated particle size:

TABLE III

| Average Particle Diameter—Microns | Number of Arc Tests | Median Arc Resistance Seconds |
|---|---|---|
| Blank (no silica) | 5 | 7 |
| 5 | 5 | 17.6 |
| 2 to 4 | 6 | 33 |
| 1 to 2 | 6 | 51 |
| 0.02 | 5 | 103.4 |

The effect on arc resistance of varying proportions of a finely divided silica powder having an average particle size of 0.02 micron when added in the indicated amounts to composition C is indicated in the following table:

TABLE IV

| Amount of Silica, percent | Arc Resistance Seconds |
|---|---|
| 3 | 93 |
| 4 | 85 |
| 5 | 100 to 119 |
| 10 | 183 |
| 15 | 184 |

Results similar to these were obtained upon using a silica powder having a particle size diameter of 0.5 micron wherein the arc resistance increased from 79 to 108 seconds as the amount of silica was increased from 3% to 5%.

An improvement of approximately 50% in the arc resistance of molded members is necessary to be meaningful and usable. Thus in Table III the improvement produced in the present invention is from 150% to over 1600%.

The improvement in arc resistance obtained on adding to composition A zirconium oxide and zirconium silicate powders in particle sizes of from 5 microns to 44 microns, the amount of the refractory powder being 10% in all cases, is as follows:

TABLE V

| Avg. Particle Size (in microns) | Improvement in Arc Resistance—percent |
|---|---|
| Blank | 0 |
| 44 | −10 |
| 15 | 17 |
| 10 | 42 |
| 5 | 52 |

Molded members prepared from the Composition A by adding thereto 10% of several aluminum silicate powders having different average particle sizes exhibited the improvement in arc resistance indicated in the following table:

TABLE VI

| Average Particle Diameter Microns | Improvement in Arc Resistance—percent |
|---|---|
| 4.2 | 50 |
| 1.5 | 67 |
| 0.8 | 90 |
| 0.5 | 88 |

It will, accordingly, be apparent that molded phenolic members which ordinarily have extremely poor arc resistance can be very materially improved by adding thereto as little as 3% of finely divided, non-conducting inorganic refractory of not in excess of 5 microns. Such members may be prepared with the inorganic refractory powders being incorporated in only the surface portions of the molded members; for example, in the portion near the surface to a depth of 20% of the member, while the remainder of the body of the member comprises a conventional phenolic composition without the inorganic refractory powders. For many applications, members so prepared to present a high arc resistance surface will function satisfactorily. This is particularly the case with electrical apparatus subject to only occasional arcing.

Referring to the drawing, there is illustrated an electrical circuit interrupter or switch comprising a molded base casing 10 and cover 12, both being prepared from the arc-resistant molding compositions of this invention. In the base casing 10 is disposed a fixed contact member 14 mounted on a conductor stud 16 carrying electrical current from an external electrical conductor which is to be fastened thereto. A movable contact member 18 mounted on movable arm 20 is adapted to move into circuit closing contact with contact member 14 and to separate therefrom when the circuit is to be broken. Electrical current is carried to contact member 18 by a flexible conductor 22 which is attached at one end to the arm 20 and at its other end to a bent arm 24 fastened by stud 26 to the base casing 10, to which stud 26 is attached an external conductor. A spring 28 enables arm 20 to snap into circuit closed or open position upon proper movement of a normally operated toggle member 30. When contacts 14 and 18 separate while carrying current, an arc develops therebetween, and the adjacent portions of casing 10 are subjected to such arcing. By making the casing 10 and cover 12 of the arc resistant molding composition of this invention, any adverse tracking is prevented and satisfactory operation of the switch under load is assured. A more detailed description of this switch is given in U. S. Patent 2,660,643, assigned to the assignee of the present invention.

In circuit interrupters, fuses, and other electrical apparatus which are ordinarily subjected to considerable arcing, it will be desirable to make the entire insulating member with the finely divided inorganic refractory and preferably in the amount of 10% or more by weight of the composition. Such members will withstand repeated arcing without development of conducting paths or tracking to any greater extent than is available with any resinous material known at the present time.

Boron nitride is especially effective as an additive to phenolic molding compositions, since it appears in some respects to be superior to any of the other inorganic compounds.

It will be understood that the above description is only illustrative and not limiting.

I claim as my invention:

1. In a circuit interrupter device having an electrical current carrying member which develops an arc during circuit interrupting operation of the device, a molded electrically insulating member disposed adjacent to the electrical current carrying member and in close proximity to point where the arc develops whereby the surface of the molded insulating member is heated and decomposed thereby, at least a substantial thickness of the surface of the molded electrically insulating member composed of from 90% to 30% by weight of phenol-aldehyde resin, said phenol-aldehyde resin alone characterized by tracking when subjected to arcing, and the balance comprising intimately admixed fillers, at least 3% by weight of said surface of the member composed of finely divided, non-conducting inorganic refractory of an average particle size not in excess of 5 microns.

2. The circuit interrupter of claim 1 wherein the finely divided inorganic refractory is of a particle size of less than 2 microns.

3. In an electrical device having an electrical current carrying member which is subject to development of an arc in operation, a molded electrically insulating member disposed adjacent to the electrical current carrying member and in close proximity to the point where the arc develops whereby the surface of the molded insulating member is heated and decomposed thereby, the electrically insulating member composed of from 97% to 70% by weight of phenolic resin, and from at least 3% to 30% by weight of finely divided, non-conducting inorganic refractory of an average particle size of not in excess of 5 microns, the molded member being highly arc-resistant.

4. The electrical device of claim 3, wherein the molded insulating member further comprises powdered fibrous fillers in an amount of up to 120% of the weight of the composition.

5. The circuit interrupter of claim 3, wherein the finely divided inorganic refractory is boron nitride.

6. The circuit interrupter of claim 3, wherein the finely divided inorganic refractory is silica.

7. The circuit interrupter of claim 3, wherein the finely divided inorganic refractory is an inorganic silicate.

References Cited in the file of this patent

UNITED STATES PATENTS

| | | |
|---|---|---|
| 1,896,042 | Ruben | Jan. 31, 1933 |
| 1,915,969 | Barringer | June 27, 1933 |
| 2,034,522 | Loetscher | Mar. 17, 1936 |
| 2,244,548 | Benkelman | June 3, 1941 |
| 2,439,929 | Hill et al. | Apr. 20, 1948 |
| 2,649,388 | Wills | Aug. 18, 1953 |